United States Patent
Von Bose

[15] 3,680,958
[45] Aug. 1, 1972

[54] SURVEY APPARATUS
[72] Inventor: Robert J. Von Bose, Arlington, Tex.
[73] Assignee: LTV Aerospace Corporation, Dallas, Tex.
[22] Filed: Oct. 15, 1970
[21] Appl. No.: 80,848

[52] U.S. Cl. ..........................356/141, 356/2, 356/4, 356/5
[51] Int. Cl. ............................................G01b 11/26
[58] Field of Search...............343/105 R, 105 LS, 11; 356/141, 4, 5, 2

[56] References Cited

UNITED STATES PATENTS

| | | | |
|---|---|---|---|
| 2,611,127 | 9/1952 | Palmer | 343/105 |
| 3,200,398 | 8/1965 | Witt | 343/11 |
| 3,242,340 | 3/1966 | Layne | 356/4 |
| 2,894,259 | 7/1959 | Korn et al. | 343/11 |
| 3,409,368 | 11/1968 | Fernandez | 356/5 |

Primary Examiner—Benjamin A. Borchelt
Assistant Examiner—S. C. Buczinski
Attorney—H. C. Goldwire and Jack A. Kantz

[57] ABSTRACT

Disclosed is an automated surveying system composed of three separate stations. Two base line stations are positioned at selected points on the terrain and the distance between them measured. A third station is positioned at successive remote points on the terrain, removed from the base line stations, and topographic and contour data are collected for each successive remote location of the third station by measuring the distance between each of the stations, the difference in elevation between each of the stations, and the bearing of the remote station relative to the base line stations. Each of the base line stations contains distance measuring equipment and apparatus for measuring both elevational and horizontal angles. Data collected by two of the stations are transmitted to a main one of base line stations which contains data processing equipment to convert the data to a map of the terrain as the survey data are collected.

8 Claims, 4 Drawing Figures

PATENTED AUG 1 1972 3,680,958

ROBERT J. VON BOSE
INVENTOR

BY *Jack A Kang*
ATTORNEY

SURVEY APPARATUS

This invention relates to survey apparatus. More particularly, it relates to an automated survey system for obtaining contour and other topographic data for automatically plotting field data to produce topographic and contour maps at the surveying site and during the collection of such data.

Field surveying data are conventionally obtained by a two or three-man surveying crew which measures the distance separating two points on the surveyed terrain and the elevational difference between the two points, one point being a base station and the other point a remote station. The remote station is then moved to a second remote point and the process repeated. To determine the relative positions of the remote points, the azimuthal or horizontal angle between lines interconnecting the base station and each of the two remote points is also determined. Elevational differences between the data points are also measured. The data obtained relating to elevational differences, separation distances, and horizontal angle are usually recorded as field notes which are later used to produce topographical or contour maps of the area surveyed.

One of the major disadvantages of conventional methods for obtaining surveying data is that the field notes taken by the surveying crew at the survey site may not contain sufficient data to provide complete topographical or contour maps. Since conventionally, the surveying field data is not converted on site to produce the map, the surveyor may not realize that important topographical or contour information has been overlooked. Accordingly, the survey crew must return to the site to take additional data, resulting in costly and time-consuming delays. According to the present invention, a combination apparatus is provided which quickly measures the distances between a main base station, a remote base station, and a surveying target rod and also determines elevational differences between the main base station and the surveying target rod. Concurrently therewith, the data taken by the apparatus are automatically processed and plotted to produce a contour or topographic survey map of the area being surveyed. Accordingly, since the data are automatically converted to a topographical or contour map of the area while the data are being taken, the operator may inspect the map at the site to determine if all necessary data have been collected and the necessary information displayed on the map. An additional advantage of the apparatus of this invention is that only a single operator is required in connection with collecting and plotting all the data necessary for any second order topographical or survey map. Therefore, vast savings in manpower and time are realized.

Other features and advantages of the invention will become more readily understood from the following detailed description taken in connection with the appended claims and attached drawings in which:

Figure 1:
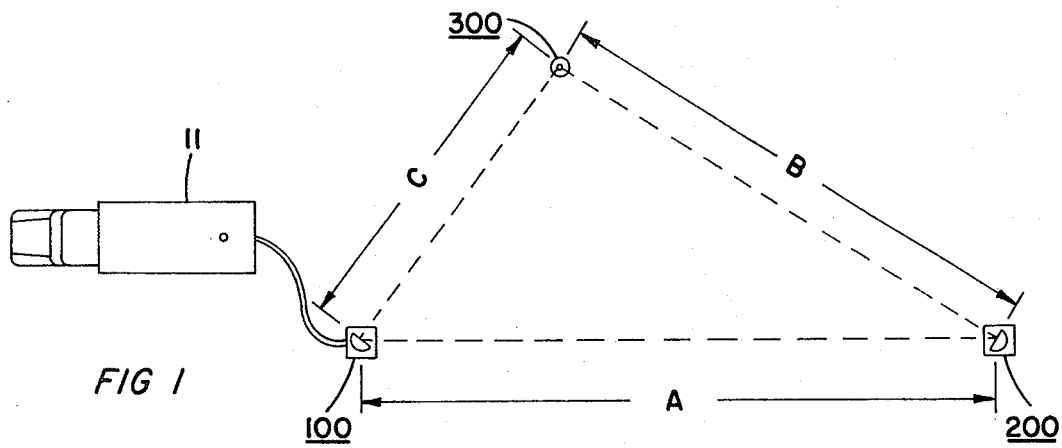
FIG. 1 is a schematic illustration of the surveying system of the invention.

The surveying system described herein comprises three self-contained stations as shown in FIG. 1. The main base line station 100 comprises a mobile vehicle such as truck 11 which carries an electrical power generator, data conversion equipment, a computer, transmitters and receivers (more fully described hereinafter), and ranging equipment to determine distances to the remote stations. The remote base line station 200 contains distance measuring equipment, a receiver to receive control signals from the main base line station and the target rod, a transmitter to send data to the main base line station, and necessary power sources to operate such equipment. The target rod 300 carries a corner reflector, a transmitter for sending control signals to the base line stations, a receiver to receive information from the main base line station, and the necessary control apparatus to command control functions of both base line stations.

For collecting the desired surveying data, the main base line station 100 and the remote base line station 200 are positioned at selected sites separated by distance A within line of sight of each other. The distance A between main base line station 100 and remote base line station 200 is measured by the distance measuring equipment at each station. The target rod 300 is placed at a remote location which is separated from the remote base station by distance B and from the main base line station by distance C. The distances B and C are determined by distance measuring equipment of the remote base line station and the main base line station, respectively. The elevational difference between the rod 300 and the main base line station 100 is determined by measuring the angle of the ranging beam relative to horizontal. All data are transmitted to a receiver aboard truck 11 and processed by the computer. The target rod is then moved to a second location and the sequence repeated until all the desired topographical or contour information is collected and displayed on a map produced by a plotter driven in response to the output of the computer.

Figure 2:
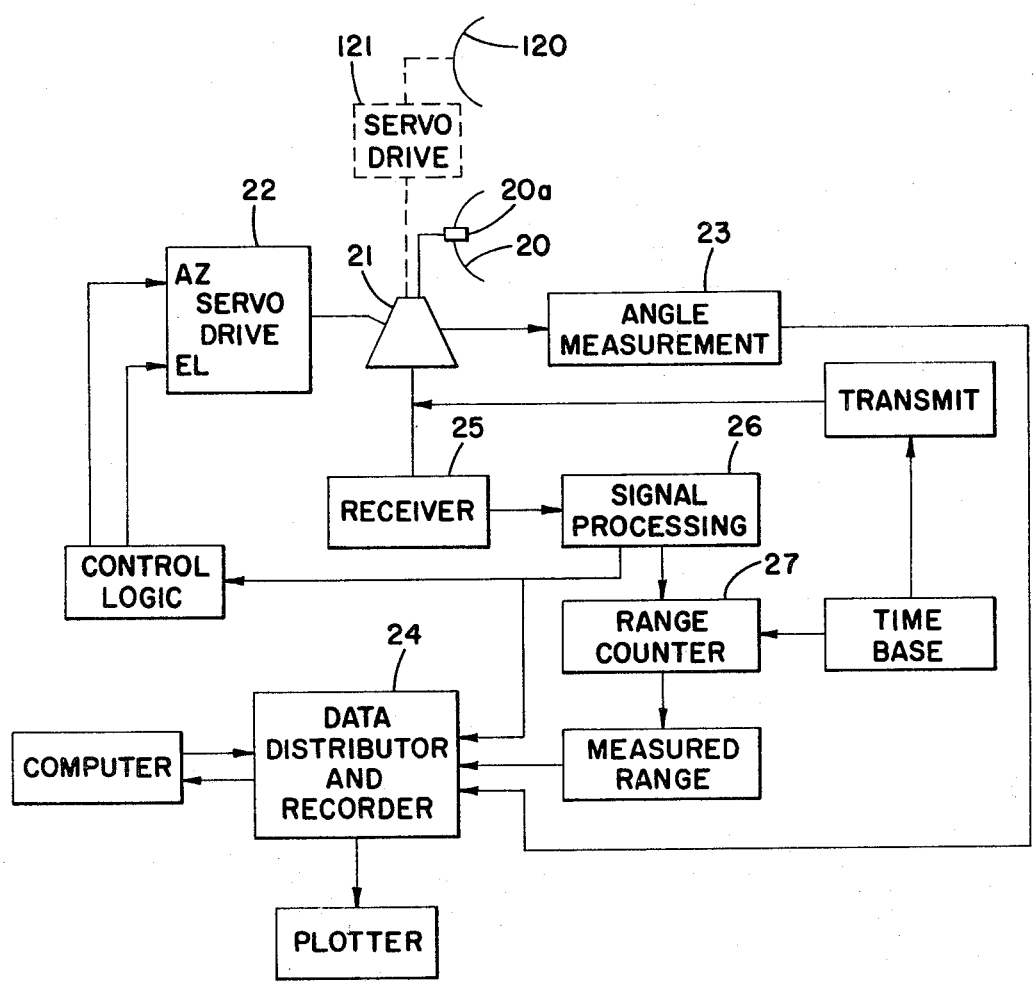
FIG. 2 is a block diagram schematic of the main base station of the invention.

A functional schematic of the main base line station 100 is illustrated in FIG. 2. The main base line station includes a steerable detector 20 mounted upon a gimbaled base 21. The detector 20 may also incorporate an optical source 20a, as will be described hereinafter, or both detector and source may be mounted upon the same gimbaled base controlled by a servo drive mechanism 22. The servo drive mechanism 22 and base 21 are operatively interconnected with suitable position detecting apparatus which measures the angle through which the detector 20 and source 20a are moved in response to command signals to the servo drive. Accordingly, azimuthal and elevational angles traversed by the detector 20 are measured by the angle measurement apparatus 23 and the angle measurement data transmitted to a computer for processing by way of suitable data distributor and recorder mechanism 24.

In the preferred embodiment of the system, disclosed distance measurements are made by optical ranging techniques well known in the art. The optical source 20a may be any suitable source of coherent or monochromatic light appropriately collimated to project a slightly divergent beam at a reflecting target on either the surveying rod 300 or the remote base line station 200. The signals reflected from the target are received by detector 20, receiver 25, and signal processing apparatus 26. The signals from processor 26 are fed to range counter 27 to determine the measured range. Range data is then transmitted to a computer by way of data distributor and recorder 24.

Figure 3:
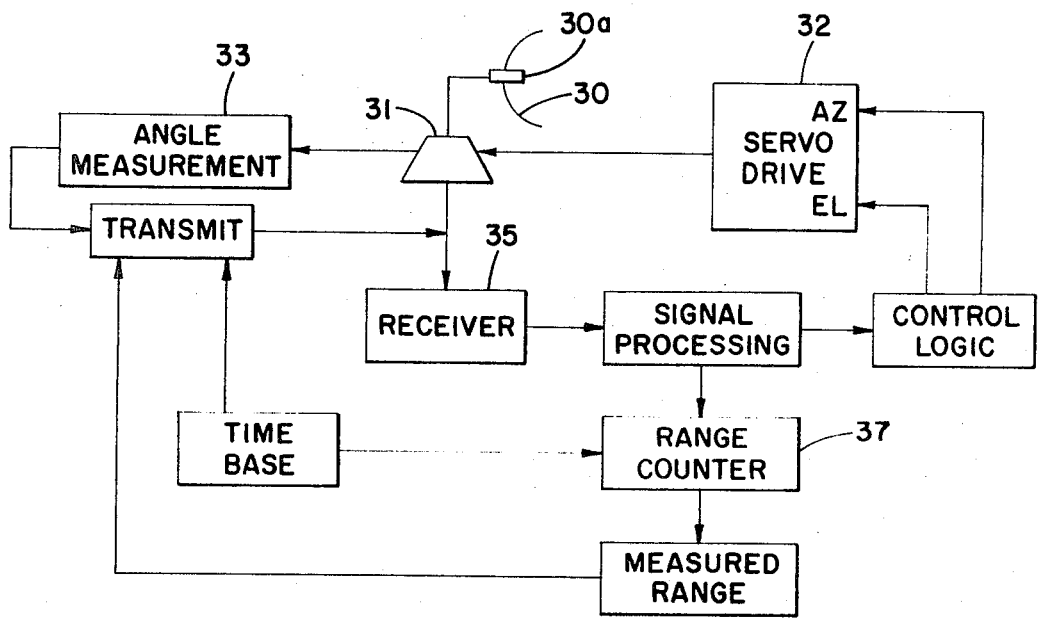
FIG. 3 is a block diagram schematic of the remote base station of the invention.

The remote base line station 200 is schematically illustrated in FIG. 3. Station 200 includes steerable detector 30 and optical source 30a mounted on a gimbaled base 31 adapted for movement by servo drive mechanism 32. The servo drive mechanism 32 and base 31 are operatively interconnected with a suitable position detecting apparatus 33 which measures the angle through which the detector 30 and source 30a are moved in response to command signals to the servo drive.

It will be observed that the source and detector of the remote base line station are substantially the same as those described hereinabove with reference to the main base line station since the remote base line station is designed to make measurements similar to those made by the main base line station. Detector 30 is steered on command to the desired attitude. Optical signals from source 30a reflected from the target are detected by detector 30 and processed through the receiver 35 and range counter 37. Thus it will be observed that the remote base line station is adapted to make both elevation and azimuthal measurements and also equipped to make range determinations for measuring distance between the remote base line station and the main base line station or the distance between the remote base line station and the target rod. The data collected by the remote base line station are transmitted to the signal processing equipment aboard the truck 11 at the main base line station. Data from the remote base line station may be transmitted over the optical beam of source 30a or may be transmitted over separate radio frequency transmitter as desired.

Figure 4:
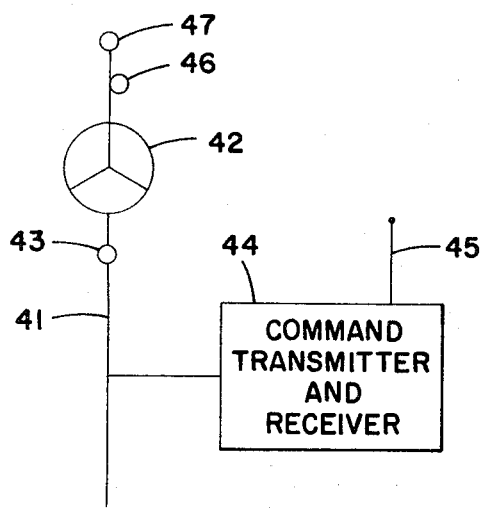
FIG. 4 is a block diagram schematic of the remote station target rod of the invention.

The target rod 300 is schematically illustrated in FIG. 4. The target rod comprises a vertical shaft 41 having a conventional corner cube 42 and a levelling device 43 mounted thereon. The target rod also contains a command transmitter and receiver 44 and antenna 45 for transmitting and receiving command information from the survey truck 11. Target rod 300 includes a sighting tube 46 for properly aligning the corner reflector 42 with the light source on either the remote base line station or the main base line station.

Corner cube 42 may be any conventional reflector adapted to reflect an optical beam toward its source. For purposes of obtaining survey data useful for second order surveying, the corner cube must have an accuracy of about 6 seconds.

Referring again to FIG. 1, typical operation of the system of the invention will be described. Remote base line station 200 is positioned at a selected point on the terrain to be surveyed. The unit is levelled and left in operative condition. The main base line station 100 is then removed a distance indicated as A in FIG. 1 from the remote base line station. Typically the operational distances separating station 100 and station 200 will be in the order of 1,000 feet. The main base line station is then positioned at a selected point on the terrain, levelled, and its position relative to magnetic North determined by conventional magnetic compass or the like. Alternatively, the position of the main base line station 100 may be determined by reference to a benchmark or other known landmark. Source 20a and detector 20 are then aligned with a reflector (which may be the detector 30) on the remote base line station 200 and the distance A measured by the main base line station. Simultaneously therewith, the bearing of the remote base line station 200 from the main base line station is also determined by the azimuthal angle measuring apparatus 23 described hereinabove.

The detector 30 and source 30a of remote base line station are also used to measure the distance A separating the main base line station 100 and the remote base line station 200. The measured data acquired by the remote base line station 200 is transmitted to the main base line station and the measurements compared for accuracy.

The target rod 300 is then moved to a remote point and established in a vertical position. Through sighting tube 46, the corner cube 42 is aligned with detector 30 and source 30a on the remote base line station 200. Upon command from the target rod transmitter 44 the remote base line detector 30 and source 30a are aligned with the target rod and the distance B separating the target rod and the remote base line station determined. Simultaneously, the elevational difference between the target rod and remote base line station is determined and the horizontal angle between lines A and B measured. These data are automatically transmitted to the survey truck 11.

The corner cube 42 is next aligned with the detector 20 and source 20a on the main base line station 100 and the process repeated. It will be observed that through the process described, the horizontal angle between lines A and B (FIG. 1), the horizontal angle between lines A and C, and the distances A, B, and C are determined. Meanwhile, the elevational differences between all three points are determined and the data automatically transmitted to the computer. When all data at each remote point are taken, the computer processes and transcribes the data to produce a map of the terrain. The target rod is then moved to a second remote location and the above-described process repeated.

Each component of the system described is conventionally available. However, certain limits must be observed to obtain data of the accuracy required for second order surveys. For example, conventional optical distance measuring equipment which projects a collimated beam of light and measures the time required for the return of a reflected beam typically have accuracies of 0.1 ft. in 1,000 ft. or better.

The ranging sources 20a and 30a are preferably coherent or at least monochromatic sources which project a slightly divergent beam.

If the source is a laser, a diverging lens may be used to provide the desired beam width at the reflector. It is, of course, not necessary that the ranging beam be divergent for ranging purposes, but a divergent beam facilitates acquisition and tracking of an associated reflector. Since the ranging beam is also used for measuring horizontal angles, accurate reflector tracking by the source 20a and reflector 20 is essential. To obtain acceptable surveying data, the measured horizontal angles must be accurate within ± 0.1 milliradian.

Likewise, elevational angles must be measured with the same degree of accuracy. For this purpose, the detector 20 and source 20a are mounted on a gimbaled base 21 driven by the servo drive mechanism 22. In operation, the source 20a is aligned with an associated reflector and a reflected beam detected by the detector 20. In conventional fashion, once the reflected signal is acquired, the servo drive, which is responsive to the detected signal, adjusts the platform 21 to receive maximum signal strength. Obviously, maximum detected signal occurs when the center of the beam is reflected by the reflector. The beam is preferably slightly divergent to allow acquisition of a reflected signal without complete alignment. The servo mechanism can then adjust to maximum signal strength to achieve the desired alignment.

Since the servo mechanism required to obtain accuracies of 0.1 milliradian is very sensitive to movement of the reflector, an alternative apparatus may be used to track the target and keep the detector aligned within the beam width. For this purpose, a light source 47 (FIG. 4) may be attached to the target rod 41. Source 47 may be an omnidirectional light source and is preferably essentially monochromatic. A sensor 120 (FIG. 4) which controls a second servo drive mechanism 121 is mounted on the same gimbaled platform as the detector 20. Sensor 120 is preferably responsive only to the wavelength of the light or other electromagnetic energy of the source 47 on the target rod and not the wavelength of the ranging beam. Servo drive 121 may be considerably less sensitive and accurate than servo drive 22, but should have a relatively fast response time. Therefore, detector 120 and servo drive 121 may be used to track the target rod as the rod is being moved from one location to the next, thereby keeping detector 20 always aligned toward the target rod within the width of the range beam. When the target rod is placed at the desired remote point, source 47 and sensor 120 are deactivated and the ranging equipment activated. In this manner, the source 20a and detector 20 will be aligned with the target and will not need search and target acquisition capabilities. Other tracking arrangements will become apparent to those skilled in the art, in view of the above.

While the preferred embodiment of the invention has been described with reference to optical ranging techniques, it will be apparent to those skilled in the art that other portions of the electromagnetic spectrum may also be used. For example, radar operating in the appropriate wavelengths may be used in the method described.

It will also be observed that using radar of the appropriate wavelength, mechanical angle resolving devices may be eliminated by substituting electronically phased array radar devices for the optical source, detector, and gimbaled base. Radar arrays appropriately electronically phased to make the ranging and angle measurements required for second order surveys are conventionally available.

It will be observed that by using the system disclosed, a single operator may collect all surveying data without assistance. Furthermore, the data collected is automatically processed and the information displayed in map form at the surveying site.

After the survey is complete the surveyor may inspect the maps produced by the computer to determine that all the required information has been gathered and that the map is sufficient in all the required detail.

It should also be observed that the computer may be programmed as desired to plot the information in detail and interpolate between actual data points to produce the desired maps. Therefore, the surveyor using the system of this invention may be required to take fewer actual data points than would ordinarily be required and may program the computer to interpolate between data points to produce the desired map.

In the embodiment described, the lengths of all three sides of the triangle formed by the three surveying stations are measured. Accordingly, azimuthal angle measurements are not essential to determination of the precise location of the data points. However, since the equipment is adapted to make both distance and angle measurements, and since the system includes an on site computer, the additional data may be used for comparison and correction as well as for back-up information to constantly monitor the reliability of the system. Likewise, since all sides and angles of the triangle are known, elevational differences between the main base station and the remote data point may be taken only at the main base station. Once the elevational difference in the base stations is determined, only a single elevational measurement for each remote data point is required. Accordingly, the system may be modified to make only the minimum required measurements. For example, the target rod may include a transit capable of determining elevational differences in the target rod and the main base line station. The only elevational measurement required may then be taken by the operator at the target rod and the data transmitted to the main base line station by appropriate means.

While the invention has been described with particular reference to specific embodiments thereof, it will be understood that various modifications and changes may be made by those skilled in the art without departing from the spirit and scope of the invention as defined by the appended claims.

I claim:
1. Surveying apparatus comprising:
 a. a moveable target rod including
   i. leveling means for establishing said rod in a vertical position, and
   ii. reflecting means for returning electromagnetic signals directed at said reflecting means to the source of said signals;
 b. a main base line station including
   i. means for measuring the distance separating said main base line station and said target rod,
   ii. means for measuring the distance separating said main base line station and a remote base line station recited below,
   iii. means for measuring the elevational difference between said main base line station and said target rod, and
   iv. means for measuring the elevational difference between said main base line station and said remote base line station;
 c. a remote base line station including
   i. means for measuring the distance separating said remote base line station and said target rod, and ii. means for transmitting measurement data taken at said remote base line station to said main base line station.

2. The apparatus defined in claim 1 and further including
   a. data converting means for collecting measurement data taken by said remote base line station and said main base line station and converting said data to signals for driving a plotter, and
   b. a plotter responsive to the signals from said data converting means for recording and displaying the collected data in map form.

3. The apparatus defined in claim 1 including a control transmitter mounted on said target rod, said control transmitter being operative to initiate data measurement functions of said main base line station and said remote base line station.

4. The apparatus defined in claim 1 wherein said remote base line station includes
   a. means for measuring elevational differences between said remote base line station and said target rod,
   b. means for determining the bearing of said target rod from said remote base line station, and
   c. means for measuring the distance separating said main base line station and said remote base line station.

5. Surveying apparatus comprising:
   a. a moveable target station comprising
      i. means for reflecting electromagnetic signals to the source of said signals, and
      ii. control means for initiating measurement functions performed by a station removed from said target station;
   b. a main base line station removed from said target station including
      i. means for measuring the distance separating said target station and said main base line station and including means for directing electromagnetic signals toward said target station and means for detecting electromagnetic signals reflected from said target station;
      ii. means for measuring the elevational angle of said electromagnetic signals with respect to horizontal when said signals are reflected from said target station;
      iii. means for measuring the horizontal angle through which said means for directing electromagnetic signals is moved when said means for directing electromagnetic signals is moved from a first position to a second position to reflect signals from said target station at first and second remote locations, respectively; and
   c. a remote base line station removed from said target station and said main base line station and including
      i. means for measuring the distance separating said target station and said remote base line station and including means for transmitting electromagnetic signals reflected from said target station, and
      ii. means for transmitting data collected by said remote base line station to said main base line station.

6. The apparatus defined in claim 5 and further including:
   a. a source of electromagnetic signals on said target station, and
   b. tracking means associated with said main base line station and responsive to the last-named electromagnetic signals for orienting said means for detecting electromagnetic signals reflected from said target station into a position to receive said reflected signals.

7. The apparatus defined in claim 6 wherein:
   a. said source of electromagnetic signals on said target station emits omni-directional radiation of a wavelength different from the wavelength emitted by said means for directing electromagnetic signals toward said target station; and
   b. said means for directing electromagnetic signals toward said target station emits a collimated beam directed at said target station upon command from said target station.

8. Surveying apparatus comprising:
   a. a main base line station including
      i. means for measuring the distance separating said main base line station and a target rod recited below,
      ii. means for measuring the distance separating said main base line station and a remote base line station,
      iii. means for measuring the elevational difference between said main base line station and said remote base line station;
   b. a moveable target rod including
      i. leveling means for establishing said rod in a vertical position,
      ii. reflecting means for returning electromagnetic signals directed at said reflecting means to the source of said signals; and
      iii. means for measuring the elevational difference between said main base line station and said target rod; and
   c. a remote base line station including
      i. means for measuring the distance separating said remote base line station and said target rod, and
      ii. means for transmitting measurement data taken at said remote base line station to said main base line station.

* * * * *